United States Patent [19]

Feild

[11] Patent Number: 4,928,920
[45] Date of Patent: May 29, 1990

[54] FINELY-ADJUSTABLE FLOW CONTROL VALVE

[75] Inventor: Eugene P. Feild, Ft. Wayne, Ind.

[73] Assignee: Laminar Fluid Controls, Inc., Fort Wayne, Ind.

[21] Appl. No.: 353,596

[22] Filed: May 18, 1989

[51] Int. Cl.5 .................. F16K 31/50; F16K 47/08; F16K 1/04

[52] U.S. Cl. .................................. 251/118; 251/265; 251/282; 251/333

[58] Field of Search ................ 251/265, 118, 333, 282

[56] References Cited

U.S. PATENT DOCUMENTS

| | | | |
|---|---|---|---|
| 477,192 | 6/1892 | Bastian | 251/265 |
| 1,007,338 | 10/1911 | Cochrane et al. | 251/265 |
| 1,762,771 | 6/1930 | Eble | 251/265 X |
| 2,966,170 | 12/1960 | Raulins . | |
| 3,409,271 | 11/1968 | Kallenbach | 251/265 |
| 4,768,558 | 9/1988 | Weber . | |

*Primary Examiner*—Arnold Rosenthal
*Attorney, Agent, or Firm*—Marger & Johnson, Inc.

[57] ABSTRACT

A valve body includes a cylindrical seat having a substantially flat working face. A cylindrical valve member having a working surface thereon is slidable toward and away from the seat face to vary flow from the outer peripheries of the seat and valve member into an orifice extending into the seat and in communication with the seat face. The valve member is mounted on a stem which is in threaded engagement with the radially inner surface of an annular member. The outer surface of the annular member is in threaded engagement with the valve body. The inner threads have 12 threads per inch and the outer threads have 11 threads per inch thereby moving the valve stem 0.0075 inches per 360° revolution of the annular member.

9 Claims, 3 Drawing Sheets

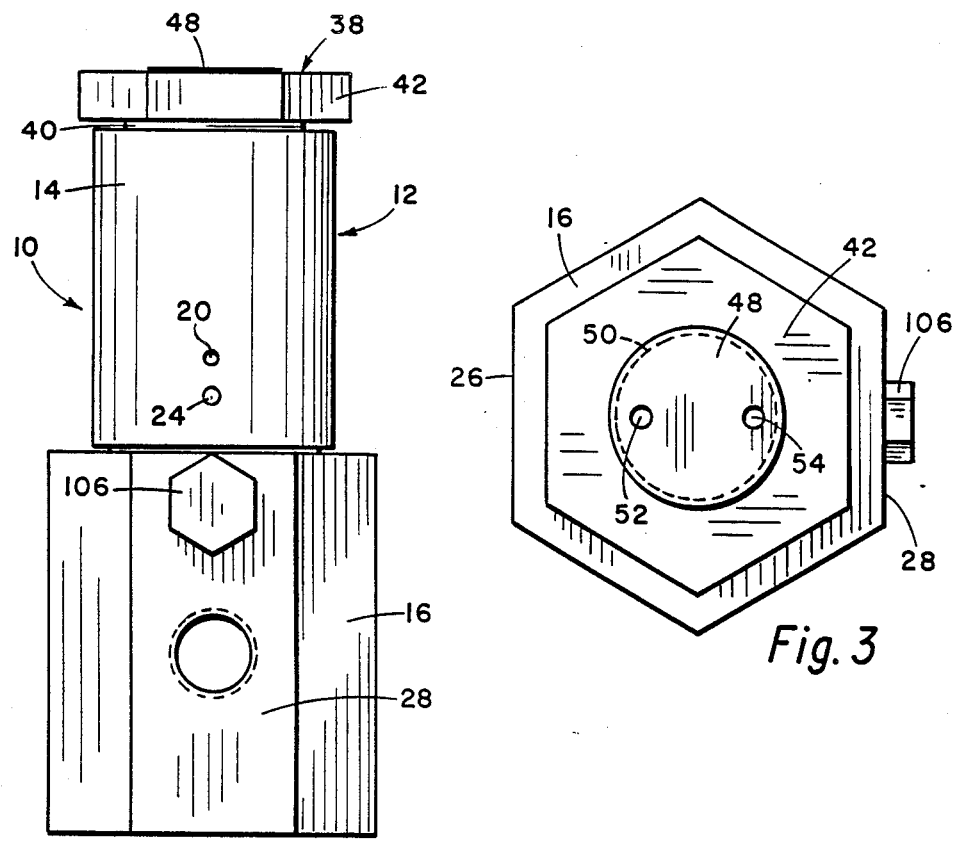
Fig. 2
Fig. 3
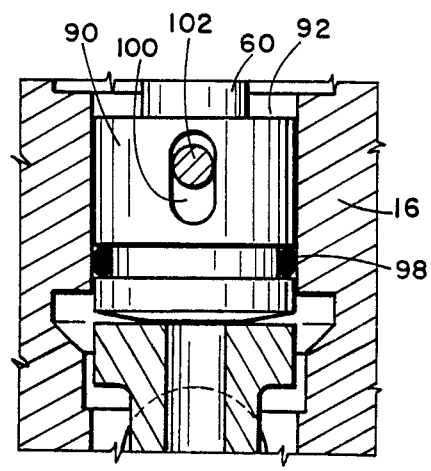
Fig. 5
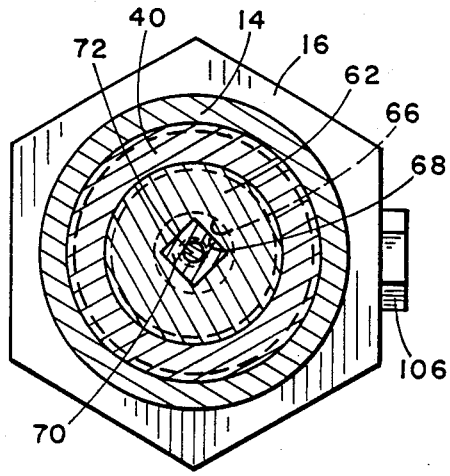
Fig. 4

FINELY-ADJUSTABLE FLOW CONTROL VALVE

BACKGROUND OF THE INVENTION

1. Field of the Invention

The present invention pertains to flow control valves and more particularly to such valves which are suitable for controlling fluids at high pressures and flow rates.

2. Description of the Related Art

A typical prior art flow control valve includes a stem having a cone mounted on the lower end thereof which is movable toward and away from an orifice for regulating flow therethrough. The cone is received in a housing cavity which is in fluid communication with an inlet and an outlet. In operation, fluid enters the inlet and leaves the outlet at a reduced pressure and/or flow rate depending on the relative positions of the cone (which is set by turning the stem) and the orifice.

Such prior art valves suffer from several disadvantages. Under extremely high flows and pressures, large axial forces are exerted on the stem making the same very difficult, if not impossible, to adjust when fluid is flowing through the valve. Flow through such valves is typically turbulent rather than laminar thereby increasing wear on the valve.

Such prior art valves are also relatively imprecise in that the same orifice opening may not be obtained when the stem is rotated to different angular positions and thereafter returned to a previous angular position. In other words, a precise valve setting may not necessarily be repeatedly obtained. This is especially true when dealing with valves designed for high flow rates and pressures. Stem threads which will withstand such flows and pressures must be relatively deep and wide. Thus, the maximum number of threads per axial inch is limited. This limitation on the maximum number of threads per inch limits the precision with which the valve can be repeatedly reset to obtain a selected flow rate through the valve.

SUMMARY OF THE INVENTION

In one aspect, the instant invention comprises a valve body having a first valve member mounted thereon. A substantially flat working face formed on the first valve member is in fluid communication with a bore formed in the valve body. A second valve member is received in the bore and has its first side directed towards the first valve member and a second side opposite thereto. The first side has a substantially flat working face formed thereon. A shaft is coaxially received in the bore and is connected to the second side of the second valve member. Inlet means formed in the housing permit a flow of fluid to a location adjacent the outer peripheries of the working faces. One of the valve members has an orifice extending thereinto from its working face. The working faces are flushly engageable with each other near the orifice to prevent fluid flow through the orifice. Outlet means is coupled with the housing for permitting a flow of fluid out of the orifice. Means are provided for equalizing pressure between the first and second sides of the second valve member.

In another aspect of the invention a valve member is mounted on one end of a valve stem which is axially moveable relative to a valve body for positioning the valve member relative to a valve seat. An annular member includes a pair of coaxial threaded connections, the first being formed between the valve body and the annular member and the second being formed between the annular member and the valve stem. The first threaded connection has a different number of threads per unit of axial length than the second threaded connection. Means are provided for constraining rotational movement of the valve stem relative to the valve body. A first side of the valve member is directed toward the valve seat. A second side of the valve member is opposite the first side and means are provided for equalizing pressure between the first and second sides of the valve member.

One such prior art valve, U.S. Pat. No. 4,768,558 to Weber discloses a multi-port valve assembly which includes a plurality of needle valves mounted on a plunger which is movable toward and away from a plurality of orifices for regulating flow through the orifices. The Weber valve assembly is not suitable for high pressures. It incorporates needle valves which create turbulence thereby increasing wear and noise and hindering accurate repeatable selection of a predetermined flow rate for a constant selected input pressure. In other words, a precise position of the needle valve relative to the orifice into which it extends cannot be repeatedly obtained.

U.S. Pat. No. 2,966,170 to Raulins discloses a temperature compensated metering valve having a pair of threads for adjusting the position of the valve stem relative to a valve seat. The Raulins device is not suitable for high pressures and flows primarily because the valve piston is not pressured balanced. The high pressure fluid in the valve exerts a force across substantially all of the cross-sectional area of the valve member. This force may prevent accurate valve adjustment and when very high pressures are present, may prevent substantially all adjustment.

It is an object of the present invention to provide a finely-adjustable fluid flow control valve which overcomes the above-enumerated disadvantages of the prior art.

Another object of the present invention is to provide such a valve which can accurately and precisely control flow over a wide range and at extremely high flows and pressures.

It is another object of the invention to provide such a valve which is relatively easily adjustable when the valve is subject to high flows and pressures.

It is still another object of the present invention to provide such a valve which can be used to repeatably select a precise flow rate.

The foregoing and other objects, features and advantages of the invention will become more readily apparent from the following detailed description of a preferred embodiment which proceeds with reference to the drawings.

BRIEF DESCRIPTION OF THE DRAWING

FIG. 2 is a full view taken along line 2—2 of FIG. 1.

FIG. 3 is a top plan full view taken along line 33 in FIG. 1.

FIG. 4 is a sectional view taken along line 4—4 in FIG. 1.

FIG. 5 is a sectional view taken along line 5—5 in FIG. 1.

DETAILED DESCRIPTION OF THE PREFERRED EMBODIMENT

Figure 1:
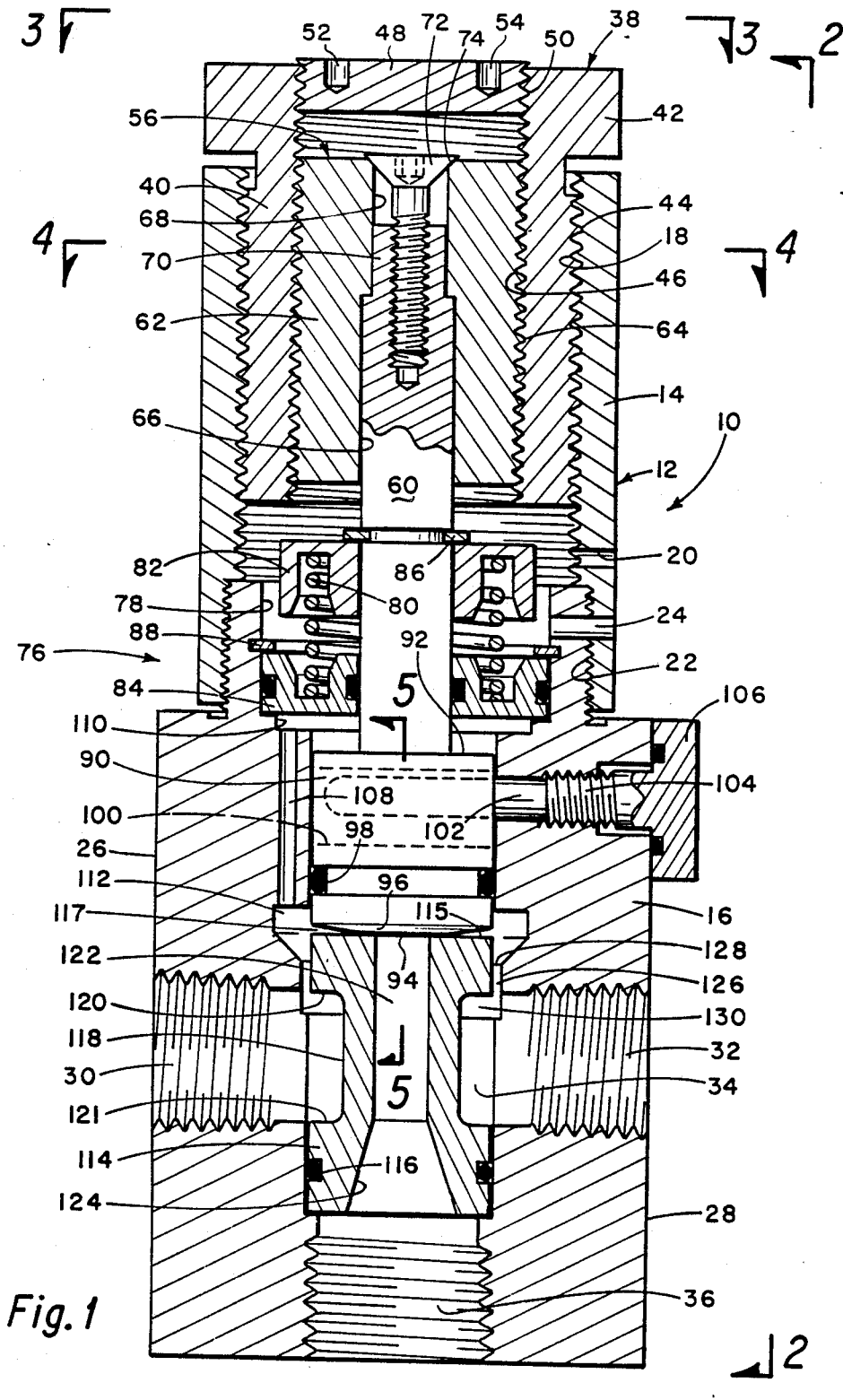
FIG. 1 is a sectional view of a flow control valve constructed in accordance with the present invention.

Turning now to the drawing and particularly to FIGS. 1 and 2, indicated generally at 10 is a flow control valve constructed in accordance with the present invention. Valve 10 includes a valve body 12 which is made up from an upper portion 14 and a lower portion 16. Upper valve body portion 14 comprises a cylindrical member having a coaxial bore therethrough with a set of threads 18 being formed on the radially inner surface of upper portion 14. A radial vent bore 20 provides fluid communication between the interior and exterior of upper portion 14 for a purpose which will be hereinafter described. A threaded counterbore 22 is formed in the lower end of upper portion 14 and is engaged with lower valve body portion 16. A pin 24 is received through a pair of coaxial radial bores in upper and lower portions 14, 16 thereby fixing the same against rotation relative to one another.

Lower valve body portion 16 is hexagonally shaped, best viewed in FIG. 2 and 3. Portion 16 includes a pair of opposing sides 26, 28 having formed therein a pair of opposing bores 30, 32, each of which is in fluid communication with the exterior of the valve body and with a bore 34, such also being referred to herein as a cavity. Bore 34 extends axially through lower valve body portion 16. A lower threaded portion 36 of bore 34 is referred to herein as an outlet bore with either of bores 30, 32 providing an inlet bore. As will later be discussed in more detail, only one of bores 30, 32 is used as an inlet with the other typically being sealed with a plug (not shown) or in fluid communication with other fluidic components.

Upper valve body portion 14 is threadably engaged with an annular member 38, such being also referred to herein as a first cylindrical member. Annular member 38 includes a cylindrical lower portion 40 and a hexagonal upper portion 42. Annular member 38 includes a set of threads 44 formed on the radially outer surface of cylindrical lower portion 40. The annular member further includes an axial bore formed therethrough with a set of threads 46 being formed on the radially inner surface thereof. Threads 44, like threads 18, are buttress threads having 11 threads per axial inch. Threads 18, 44 are engaged with one another to form a first threaded connection.

Threads 46 likewise are buttress threads but contain 12 threads per axial inch. A cap 48 is engaged via threaded connection 50 with threads 46 of the annular member. A pair of bores 52, 54 are formed in the upper surface of cap 48 and are engageable with a tool (not shown) to facilitate engaging and disengaging the cap with annular member 38.

A cylindrical valve shaft or stem 56 includes a shaft 60 and a shaft-retaining cylindrical element 62. Cylindrical element 62 includes a set of threads 64 on the radially outer surface thereof. Threads 18, 44 are referred to herein as a first threaded connection and threads 46, 64 are referred to herein as a second threaded connection. Cylindrical lower portion 40 of annular member 38 is coaxial with cylindrical element 62 and thus the first and second threaded connections are also coaxial.

Cylindrical element 62 includes a coaxial bore 66 into which a portion of shaft 60 is received. A passageway 68 is defined between the upper portion of bores 66 and the top surface of cylindrical element 62. As best viewed in FIG. 4, passageway 68 is square and receives therein an upper portion 70 of shaft 60 which is also square in and is sized to be tightly received in passageway 68. A screw 72 is threadably engaged in a coaxial bore formed in shaft 60. Screw 72 is tightened against a chamfered shoulder 74 and thus restrains shaft 60 from both axial and rotational movement relative to cylindrical element 62.

Indicated generally at 76 is a spring assembly, a portion of which is received in a counterbore 78 formed in lower portion 16 of valve body 12 coaxial with bore 34. Spring assembly 76 includes a spring 80 which is constrained between an annular spring holder 82 and an annular seal ring 84. A split ring 86 is received over a groove in shaft 60 as shown and constrains the spring holder against upward movement. Seal ring 84 is tightly received in counterbore 78 and includes a radially outer o-ring which seals between a radially outer surface of seal ring 84 and the radially inner surface of counter bore 78. A second o-ring as shown seals between the radially inner surface of the seal ring and the radially outer surface of shaft 60. Seal ring 84 is held against the lower end of counter bore 78 by a split ring 88 which is received in an annular groove formed on the radially inner surface of counter bore 78. With spring 80 compressed as shown, valve stem 56 is biased upwardly relative to valve body 12. Spring 80 is referred to herein as means for applying an axial biasing force.

A valve member 90, referred to herein as a second valve member, is formed on the lower end of shaft 60. Valve member 90 is substantially cylindrical in shape and includes a second side or upper surface 92. The lower surface of valve member 90 includes a substantially flat working face 94 which is substantially parallel to upper surface 92. A frustoconical surface or taper 96 is defined between face 94 and the side of valve member 90. Taper 96 may assume any angle with respect to surface 94 but is preferably between approximately 2 degrees, 20 minutes and 25 degrees. An o-ring 98 is received in an annular groove formed on the surface of the valve member and seals between the valve member and bore 34.

An axial opening or channel 100, best viewed in FIG. 5, is formed between opposing surfaces of cylindrical valve member 90. In the present embodiment of the invention channel 100 is 0.45" from top to bottom, as viewed in FIG. 5, and 0.25" from side to side. An elongate member or rod 102 is received in channel 100. The rod in combination with channel 100 is referred to herein as means for constraining relative movement of the valve stem. Rod 102 includes a threaded portion 104 which is engaged with a threaded axial bore formed in lower valve body portion 16. A bolt head 106 is formed on the outer end of threaded portion 104 and is used to threadably engage portion 104 with valve body portion 16, as shown in FIG. 1, and thus to fix rod 102 in channel 100. An O-ring is provided in an annular groove in bolt head 106 to prevent fluid leakage from the interior of the valve body.

A bore 108 communicates at its upper end with a counter bore 110 which is coaxial with bore 34. The lower end of bore 108 communicates with a cylindrical chamber 112, such also being coaxial with bore 34. Bore 108 is referred to herein as pressure equalizing means.

A valve seat or first valve seat member 114 is annular in shape and has the lower portion thereof press-fitted into bore 34. The upper surface of valve seat member 114 comprises a substantially flat working face 115. An O-ring 116 is received in an annular groove in the lower press-fitted portion of valve seat member 114 and seals between the valve member and bore 34 about the circumferences thereof. When valve member 90 and valve seat 114 abut one another as shown in the view of FIG. 1, a wedge-shaped annular space 117 is defined therebetween. An annular groove 118, such being defined between upper and lower surfaces 120, 121, respectively, is formed about the circumference of valve seat member 114. Preferably the cross-sectional area of groove 118 is equal to approximately one-half of the cross-sectional area of each of bores 30, 32.

Valve seat member 114 includes therein a coaxial orifice or bore 122 which is in communication with a tapered passage-way 124 which in turn communicates with bore 36. Bore 122, tapered passage way 124 and bore 36 are referred to herein collectively as outlet means or as a fluid outlet.

The upper end of an annular fluid restrictor 126 is defined by a break 128 at the top of a cylindrical chamber 130 which is formed in bore 34 coaxially therewith. The lower end of the restrictor is defined by a plane substantially coplanar with surface 120. The radially outer surface of valve seat member 114 and the radially inner surface of cylindrical chamber 130 define the sides of restrictor 126. Preferably, the transverse cross-sectional area of annular restrictor 126 is between 50% and 200% of the cross-sectional area of bore 122.

In assembling valve 10 for operation, upper portion 14 is engaged via threaded counterbore 22 with lower portion 16 thus defining valve body 12 as shown in FIG. 1. Pin 24 is inserted into a pair of aligned radial bores in upper and lower body portions 14, 16 to prevent relative movement between the two portions. Next, shaft 60 is inserted in bore 34 until lower face 94 of valve member 90 is abutted against face 115 of valve seat member 114 as shown in FIG. 1. Thereafter, seal ring 84 is positioned as shown and split ring 88 is installed to secure the seal ring. Thereafter spring 80, spring holder 82, and split ring 86 are positioned as shown. Cylindrical element 62 is then secured to shaft 60 via screw 72.

Angular member 38 is then threadably engaged with threads 18 on upper portion 14 and threads 64 on cylindrical element 62. Annular member 38 moves downwardly under the action of threads 18, 44, at the rate of one inch for every 11 rotations. At the same time, cylindrical element 62 moves upwardly under the action of threads 46, 64 at the rate of one inch for every 12 rotations. Thus, cylindrical element 62 has a net downward movement relative to valve body 12 as annular body 38 rotates.

Initially, spring 80 biases valve stem 60 upwardly with upper surface 92 of valve member 90 abutting against the lower surface of seal ring 84. When working face 94 of valve member 90 approaches or abuts against working face 115 of seat 114 rotation of annular member 38 is stopped and a screwdriver is engaged with screw 72 in order to rotate cylindrical element 62 relative to annular member 38 so as to cause upward movement of shaft 60. Rotation of annular member 38 and periodic backing off of cylindrical element 62 continue as described until annular member 38, cylindrical element 62 and valve stem 60 are substantially in the configuration shown in FIG. 1. Next, a screwdriver is used in screw 72 to rotate cylindrical element 62 until channel 100 is aligned with the bore in which rod 102 is received. Rod 102 is then installed via threaded portion 104 in lower portion 16 of the valve body as shown.

In operation of valve 10, inlet 30 is connected to a pipe (not shown) which provides a flow of fluid into bore 34. Another pipe (also not shown) is connected to outlet bore 36. Bore 32, also an inlet bore, is either plugged or can be connected to other components, e.g., a pressure gauge.

After fluid enters bore 34, it flows upwardly through annular restrictor 126 about the circumference of seat 114. Even at high pressures and flow rates, annular restrictor 126 substantially evenly distributes the fluid around the outer peripheries of the opposing faces of valve member 90 and valve seat 114.

With the valve configured as shown in FIG. 1, there is no flow between the working faces and into orifice 122 because face 94 is flushly abutted against face 115 thereby sealing orifice 122.

Figure 6:
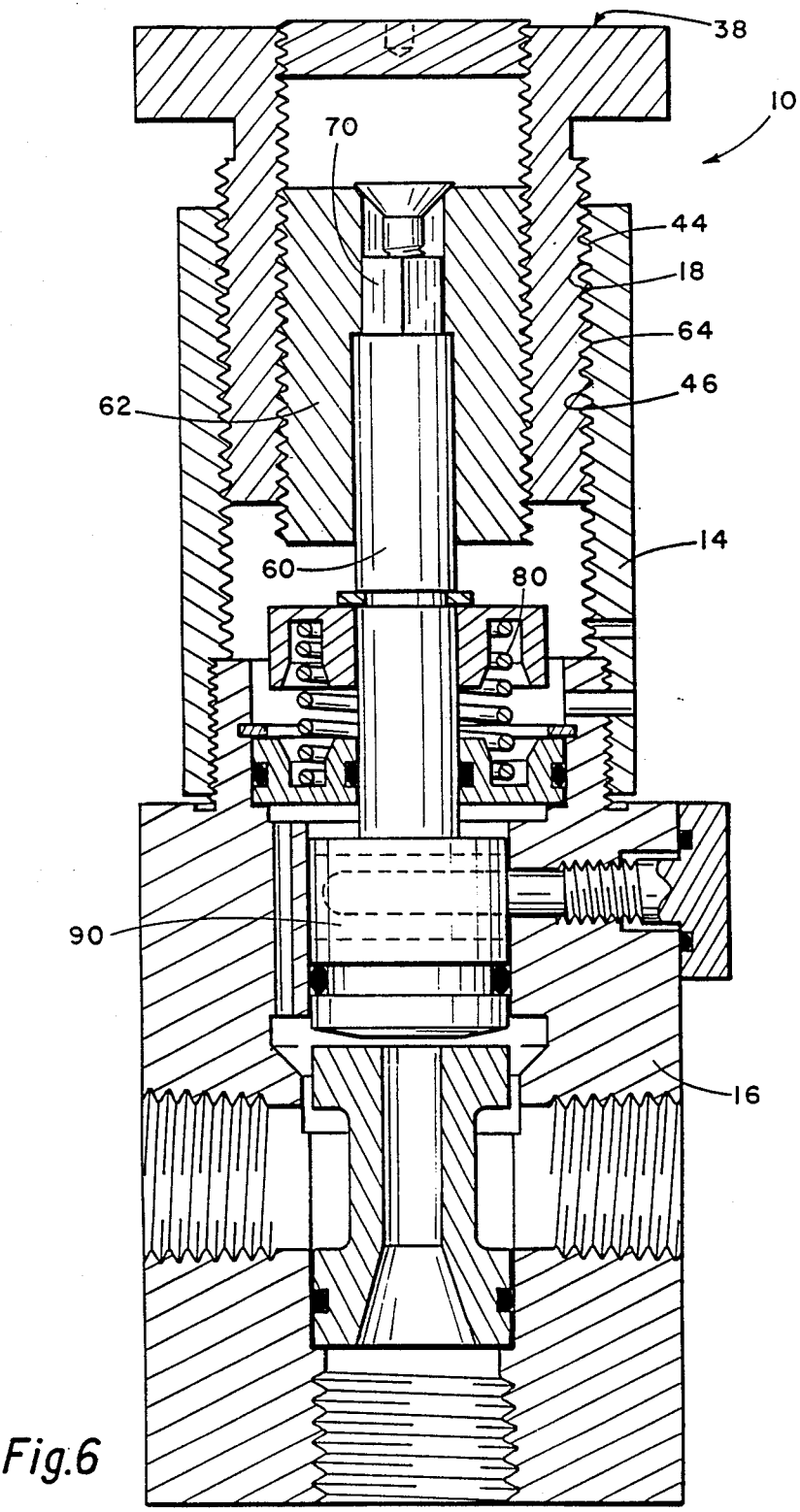
FIG. 6 is a view similar to FIG. 1 with the flow control valve assuming a more open configuration between working faces than the view of FIG. 1.

If it is desired to open the valve, adjustment nut 38 is turned thereby raising valve member 90 0.0075 inch for every 360 degree revolution of adjustment nut 38 until fluid is flowing through the valve at desired rate. An open setting of valve 10 is illustrated in FIG. 6.

Adjustment nut 38 can typically be manipulated by hand because bore 108 provides the input pressure to valve 10 to upper surface 92 of valve member 90 thereby tending to equalize fluid pressure on opposing sides of the valve member and because of the approximately 12:1 mechanical advantage created by threads 18, 44 and threads 46, 64.

Pressure on the radially inner peripheries of the opposing valve member working faces may approach atmospheric pressure, i.e., the pressure in bore 36, while pressure on the radially outer peripheries of the working faces is at the pressure of the fluid provided to inlet 30. This fluid pressure may be as high as 5000 psi and higher, thus producing a substantial pressure drop between the radially outer and inner peripheries of the opposed valve members.

In the case where, e.g., the opposed sides of the valve members are substantially parallel, rather than incorporating a taper as in the present embodiment, this pressure drop tends to be evenly distributed between orifice 122 and the radially outer peripheries of the valve members as valve member 90 approaches valve seat member 114. When such occurs, the pressure beneath valve member 90 may be substantially lower than that above it, thus exerting a substantial downward force on shaft 60.

In order to maintain the pressure drop which occurs between the radially outer peripheries of the opposed valve members and the radially inner peripheries thereof closely adjacent the radially inner peripheries (i.e., adjacent orifice 122), the facing valve member surfaces must be further apart at the radially outer peripheries thereof than at the radially inner peripheries In the case when the taper on one of the valve members defines a straight line in cross section, as is the case in the instant embodiment of the invention, it is been discovered that sufficient spacing between the faces occurs when the working faces assume an angle of at least approximately two (2) degrees, twenty (20) minutes to one another. In valve 10, taper 96 is at an angle of approximately four (4) degrees, thirty-four (34) minutes relative to working faces 94. 115 thereby defining a wedge-shaped annular space 117 between the valve members.

The present valve is hand adjustable with flow as high as 19 gallons per minute at 4,200 p.s.i. at the inlet, i.e., bores 30, 32. At higher pressures or flows it may be necessary to slightly increase the angle of taper 96 to maintain ease of adjustability.

If the taper is too large, e.g., on the order of approximately 25 degrees or larger, the valve begins acting as a needle valve thus causing turbulent flow and the resulting noise and wear of the opposed valve members adjacent the intersection of orifice 122 with working face 115. Thus, the ideal angle of taper between working faces is between about 2 degrees, 20 minutes and about 25 degrees. As used herein, the term "taper" in reference to the relative positions of the outer peripheries of the opposed valve members can include curved surfaces (in cross section) as well as flat faces, as in the present embodiment of the invention, with the "taper" or "wedge" aspect relating to an increase in the distance between the opposed valve member surfaces as the radially outer portions of the working faces are approached. It should also be appreciated that the taper can be formed on either valve member or both, so long as a wedge-shaped annular space, of a sufficient size, is present when the opposed working faces approach one another.

Spring 80 prevents hysteresis which could be introduced by slack in the first and second threaded connections by maintaining upward pressure on shaft 60, and therefore on cylindrical element 62 and annular element 38, at all times.

The minimum cross-sectional area through which flow occurs in valve 10 is defined by the radially outer surface of a cylinder having a diameter equal to orifice 122 and a height equal to the distance between working face 94 and working face 115. When the opposed working faces are operating closely adjacent one another, the radially outer surface area of such a cylinder is the minimum cross-sectional flow area in the valve. This cylinder is referred to herein as a cylindrical orifice. Relatively large rotational movement of annular member 38 changes the cross-sectional flow area only slightly thereby enabling valve 10 to be precisely and repeatedly set to predetermined flow rates.

When the pressure drop occurs closely adjacent orifice 122 rather than at the outer peripheries of the opposed valve member surfaces, low pressure appears beneath a relatively small area of valve member 90 thereby creating less downward force than if the pressure drop and thus lower pressure was evenly distributed between the radially outer peripheries of the opposed valve member surfaces and the radially inner peripheries thereof.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. Apparatus for adjusting flow through a valve body of the type having a valve member mounted on one end of a valve stem which is axially movable relative to the valve body for positioning the valve member relative to a valve seat, said apparatus comprising:
   an annular member;
   a pair of coaxial threaded connections, the first being formed between the valve body and said annular member and the second being formed between said annular member and the valve stem, said first threaded connection having a different number of threads per unit of axial length than said second threaded connection;
   means for constraining rotational movement of the valve stem relative to the valve body;
   a first side of said valve member directed toward said valve seat;
   a second side of said valve member opposite said first side; and
   means for equalizing pressure between said first and second sides of said valve member.

2. An apparatus according to claim 1 wherein said equalizing means comprises a bore formed in said housing for permitting fluid communication between the first and second sides of said second valve member.

3. An apparatus according to claim 1 wherein said valve member includes a taper formed adjacent the circumference thereof.

4. An apparatus according to claim 3 wherein said valve member and said valve seat define therebetween a substantially wedge-shaped annular space when the valve members abut one another.

5. A flow control valve comprising:
   a valve body having a bore formed therein and further having a fluid inlet and outlet for accommodating fluid flow through the valve;
   an annular member having radially inner and outer surface;
   a first threaded connection between the radially outer surface of said member and said bore;
   a valve stem having a valve member on one end thereof, said valve member being received in a cavity formed in said valve body;
   a second threaded connection between the radially inner surface of said annular member and said valve stem, said first threaded connection having a different number of threads per unit of axial length then said second threaded connection;
   means for constraining said valve stem against axial rotation relative to said valve body;
   a valve seat received in said valve body cavity and being opposite said valve member for restricting flow through the valve as said valve member approaches valve seat responsive to axial rotation of said annular member;
   a first side of said valve member directed toward said valve seat;
   a second side of said valve member opposite said first side;
   means for equalizing pressure between said first and second sides of said second valve member.

6. A flow control valve according to claim 5 wherein said first threaded connection contains 11 threads per inch and said second threaded connection contains 12 threads per inch.

7. A flow control valve according to claim 5 wherein said valve further includes means for applying an axial biasing force to said valve stem.

8. A flow control valve according to claim 5 wherein said inlet directs flow to the peripheries of said valve seat and the first side of said valve member and said outlet includes a bore formed in said valve seat for directing fluid flow from the valve.

9. A flow control valve according to claim 7 wherein said valve member is slidingly and sealingly engaged with said cavity, said biasing means comprises a spring and said spring is disposed between said valve stem and said valve body.

* * * * *

UNITED STATES PATENT AND TRADEMARK OFFICE
CERTIFICATE OF CORRECTION

PATENT NO. : 4,928,920

DATED : May 29, 1990

INVENTOR(S) : Eugene P. Feild

It is certified that error appears in the above-identified patent and that said Letters Patent is hereby corrected as shown below:

Cover Page, under Inventor, change "Ft. Wayne, Ind." to --Pierceton, Ind.--;

Column 2, line 60, change "33" to --3-3--;

Column 6, line 63, change "faces 94." to --faces 94,--;

Column 8, line 14, after "sides of said" delete --second--;

line 37, change "then" to --than--;

line 48, after "side;" insert --and--;

line 50, after "sides of said" delete --second--.

Signed and Sealed this

Sixth Day of August, 1991

Attest:

HARRY F. MANBECK, JR.

*Attesting Officer*    Commissioner of Patents and Trademarks